United States Patent [19]
Yamada et al.

[11] Patent Number: 5,945,475
[45] Date of Patent: Aug. 31, 1999

[54] SILICONE RELEASE COATING COMPOSITIONS

[75] Inventors: Takateru Yamada; Taku Koyama, both of Chiba Prefecture; Koji Nakanishi, Kanagawa Prefecture, all of Japan

[73] Assignee: Dow Corning Toray Silicone Co., Ltd., Tokyo, Japan

[21] Appl. No.: 08/978,078

[22] Filed: Nov. 25, 1997

[30] Foreign Application Priority Data

Nov. 28, 1996 [JP] Japan .................................. 8-335019

[51] Int. Cl.$^6$ ...................................................... C08K 5/54
[52] U.S. Cl. ......................... 524/588; 524/264; 524/268; 524/379; 524/380; 427/387
[58] Field of Search ..................... 524/379, 380, 524/264, 268, 588; 427/387

[56] References Cited

U.S. PATENT DOCUMENTS 3,383,356  5/1968  Nielsen .
3,445,420  5/1969  Kookoosedes et al. .
4,472,562  9/1984  Shirahata .
4,559,396  12/1985  Sasaki .

FOREIGN PATENT DOCUMENTS 1-12786   of 1989  Japan .
64-2627   of 1989  Japan .
64-51466  of 1989  Japan .

*Primary Examiner*—Veronica P. Hoke
*Attorney, Agent, or Firm*—Timothy J. Troy

[57] ABSTRACT

This invention relates to a silicone release coating composition comprising (A) a diorganopolysiloxane having at least two alkenyl groups in each molecule, (B) an organohydrogenpolysiloxane having at least three silicon-bonded hydrogen atoms in each molecule, (C) a mixture of an alkynyl alcohol and an organosiloxane having at least one aliphatic triple bond-containing alkoxy group, and (D) a platinum group metal catalyst. The silicone release coating compositions of this invention have superior curability and storage stability at room temperature, and produce a uniform coating when used in thin film form on applicator rolls.

18 Claims, No Drawings

SILICONE RELEASE COATING COMPOSITIONS

BACKGROUND OF THE INVENTION

The present invention relates to silicone release coating compositions having superior release properties when cured by the application of heat. More specifically this invention relates to silicone release coating compositions having superior curability and storage stability at room temperature and which produce uniform coatings when used in thin film form on an applicator roll.

Various heat curable organopolysiloxane compositions obtained by using an alkenyl-containing diorganopolysiloxane, an organohydrogenpolysiloxane, and a platinum group metal catalyst as their main components and admixing a reaction retardant thereto have been disclosed. These compositions, with all the components mixed in advance, could be stored for an extended period of time, however, because of this, storage stabilizers, in other words, reaction retardants, played an important role. Compounds having double carbon-carbon bonds or triple carbon-carbon bonds are known as commonly used reaction retardants, for example, ethylene tetrachloride as a reaction retardant was disclosed in U.S. Pat. No. 3,383,356, 3-methyl-1-butyne-3-ol was disclosed in U.S. Pat. No. 3,445,420, organosilicon compounds having the formula

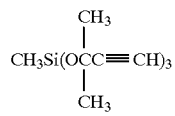

were disclosed in Japanese Patent Publication No. 64-2627 (2627/1989), organosilicon compounds having the formula:

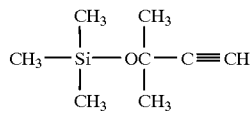

were disclosed in Japanese Patent Publication No. 01-12786 (12786/1989), and organosiloxanes containing acetylenically unsaturated groups were disclosed in Japanese Patent Publication No. 64-51466 (51466/1989) having the formula:

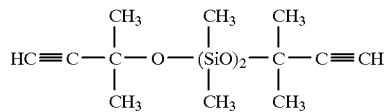

However, the respective action of these compounds was insufficient, and, as a result, heat curable organopolysiloxane compositions obtained by admixing them as storage stabilizers had various defects, such as an increase in viscosity caused by low stability at room temperature, gelling when used in thin film form on an applicator roll, which rendered uniform coating impossible, and low peeling stability when cured under low-temperature conditions.

SUMMARY OF THE INVENTION

This invention relates to a silicone release coating composition comprising: (A) a diorganopolysiloxane having at least two alkenyl groups in each molecule, (B) an organohydrogenpolysiloxane having at least three silicon-bonded hydrogen atoms in each molecule, (C) a mixture of an alkynyl alcohol and an organosiloxane having at least one aliphatic triple bond-containing alkoxy group, and (D) a platinum group metal catalyst.

It is an object of this invention to produce a silicone release coating composition having superior curability and storage stability at room temperature, even upon addition of a catalyst.

It is also an object of this invention to prepare a silicone release coating composition which produces a uniform coating when used in thin film form on an applicator roll.

DETAILED DESCRIPTION OF THE INVENTION

This invention relates to a silicone release coating composition comprising: (A) 100 parts by weight of a diorganopolysiloxane having at least two alkenyl groups in each molecule, (B) 1–20 parts by weight of an organohydrogenpolysiloxane having at least three silicon-bonded hydrogen atoms in each molecule, (C) 0.1–5.0 parts by weight of a mixture of (i) an alkynyl alcohol and (ii) an organosiloxane having the formula:

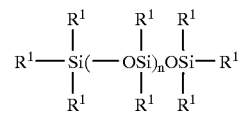

wherein each $R^1$ is independently selected from the group consisting of aliphatic monovalent hydrocarbon groups and aliphatic triple bond-containing alkoxy groups having from 1 to 10 carbon atoms, with the proviso that at least one $R^1$ group is an aliphatic triple bond-containing alkoxy group, n is an integer with a value of 0 to 10, and wherein the weight ratio of component (i) to component (ii) is from 1/20 to 20/1, and (D) a platinum group metal catalyst, in an amount such that the amount of platinum metal is from 1 to 1,000 parts by weight per 1,000,000 parts by weight of the total amount of components (A)–(C).

The diorganopolysiloxane of component (A) is a substantially linear siloxane having at least two alkenyl groups in each molecule. From the standpoint of curability, it is preferable that the alkenyl groups should be vinyl or hexenyl groups, their bonding positions being molecular chain terminals or side chains. It is preferable that silicon-bonded groups other than alkenyl groups should be substituted or non-substituted monovalent hydrocarbon groups, with methyl and phenyl groups being preferable among them. From the standpoint of operational properties and the characteristics of the formed coating films, it is preferable that the viscosity of the diorganopolysiloxanes at 25° C. should be not lower than 40 mPa·s (millipascal-seconds). Also, a solution obtained by diluting the diorganopolysiloxanes in raw rubber form with organic solvents can be used as the present component as well. Preferably component (A) is selected from the group consisting of dimethylsiloxane-methylvinylsiloxane copolymers, dimethylsiloxane-methylhexenylsiloxane copolymers, dimethylsiloxane-methylvinylsiloxane-methylphenylsiloxane copolymers, alkenyldimethylsiloxy-terminated dimethylsiloxane-methylhexenylsiloxane-methylphenylsiloxane copolymers, trimethylsiloxy-terminated dimethylsiloxane-methylhexenylsiloxane-methylphenylsiloxane copolymers, and alkenyldimethylsiloxy-terminated dimethylpolysiloxanes.

The organohydrogenpolysiloxanes of component (B) serve as cross-linking agents for component (A), and, for this reason, it is necessary that they contain at least three silicon-bonded hydrogen atoms in each molecule. Substituted or non-substituted monovalent hydrocarbon groups other than alkenyl groups are preferable as silicon-bonded groups other than hydrogen atoms. Also, it is preferable that the viscosity of the organohydrogenpolysiloxanes at 25° C. should be in the range of from 1 to 1,000 mPa·s. The organohydrogenpolysiloxanes of component (B) are preferably selected from the group consisting of dimethylhydrogensiloxy-terminated dimethylsiloxane-methylhydrogensiloxane copolymers, trimethylsiloxy-terminated dimethylsiloxane-methylhydrogensiloxane copolymers, trimethylsiloxy-terminated methylhydrogenpolysiloxanes, cyclic methylhydrogensiloxanes, copolymers comprising methylhydrogensiloxy units and $SiO_2$ units. The amount of component (B) is from 1 to 20 parts by weight per 100 parts by weight of component (A). This is due to the fact that when it is less than 1 part by weight, the rate at which the cured films are formed rapidly drops, and when it exceeds 20 parts by weight, the release characteristics of the cured films deteriorate.

Component (C) is the component serving as a reaction retardant, with the alkynyl alcohol of component (C)(i) being an organic compound having alkynyl groups and hydroxyl groups in each molecule. Preferably component (C)(i) is selected from the group consisting of 3-methyl-1-butyne-3-ol, 3-methyl-1-pentene-3-ol, 3,5-dimethyl-1-hexyne-3-ol, and 1-ethynyl-1-cyclohexanol.

The organosiloxanes of component (C)(ii) have the formula:

$$R^1-Si(-OSi)_nOSi-R^1$$

(with $R^1$ groups on each Si)

wherein each $R^1$ is independently selected from the group consisting of aliphatic monovalent hydrocarbon groups and aliphatic triple bond-containing alkoxy groups having from 1 to 10 carbon atoms, with at least one group among the $R^1$ groups being an aliphatic triple bond-containing alkoxy group. The aliphatic monovalent hydrocarbon groups can be substituted or unsubstituted. Preferred aliphatic monovalent hydrocarbon groups are exemplified by methyl, ethyl, propyl, and butyl, vinyl, and hexenyl. Preferably the aliphatic triple bond-containing alkoxy groups are selected from the group consisting of

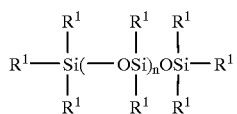

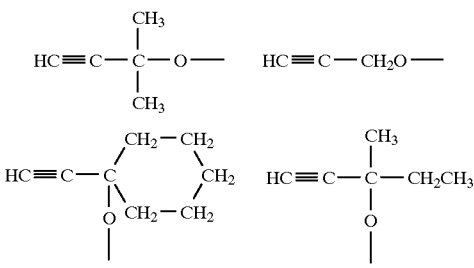

Preferably, component (C)(ii) is selected from the group consisting of

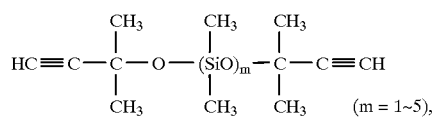

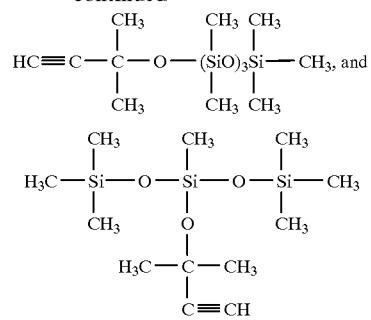

In component (C), the weight ratio of component (C)(i) to component (C)(ii) is from 1/20 to 20/1, and, preferably, from 1/5 to 5/1. The amount of component (C) is from 0.1 to 5.0 parts by weight, and, preferably, from 0.5 parts by weight to 2.0 parts by weight per 100 parts by weight of component (A). This is due to the fact that when it is less than 0.1 parts by weight, the room temperature storage stability of the composition of the present invention decreases, and its viscosity increases within a short period of time, and when it exceeds 5.0 parts by weight, the curability of the compositions of this invention dramatically decreases.

The platinum group metal catalysts of component (D) are catalysts used for curing component (A) and component (B) by cross-linking, and, specifically, are exemplified by chloroplatinic acid, alcohol-modified chloroplatinic acid, olefin complexes of chloroplatinic acid, complexes of chloroplatinic acid and vinylsiloxane, platinum microparticles adsorbed on a carbon-powder carrier, and platinum black catalysts. Although the amount of component (D) depends on the type of catalyst, in order to cure the composition of the present invention in a short period of time, usually, the amount should be such that the amount of platinum metal is from 1 to 1,000 parts by weight, and, preferably, in the range of from 30 to 600 parts by weight per 1,000,000 parts by weight of the total amount of components (A)–(C).

Although the composition of the present invention comprises the above mentioned components (A)–(D), as the occasion demands, other components commonly admixed to silicone release coating compositions may be added thereto. These components are exemplified by aromatic hydrocarbon solvents such as toluene, xylene; aliphatic hydrocarbon solvents such as heptane, hexane, and other organic solvents, branched methylvinylpolysiloxanes and non-functional diorganopolysiloxanes, and other release property-regulating agents, silica and other fillers, thickening agents, pigments, and dyes.

The substrates, on which the composition of the present invention can be used, are exemplified by paper, polyethylene-laminated paper, plastic film, cloth, and non-woven cloth. When coating the composition of the present invention on the surface of a substrate, the composition of the present invention can be used as is, or after first diluting it with an organic solvent indicated above. Also, in order to quickly form a cured coating of the compositions of this invention, upon coating the compositions of this invention on the surface of a substrate, curing is performed by heating the coating at a temperature from 50–200° C., and, preferably from 100–150° C.

Because in the compositions of this invention alkynyl alcohols and organosiloxanes containing aliphatic triple bond containing-alkoxy groups act to improve storage stability, it has superior curability and storage stability at room temperature. Also, because low-volatility organosiloxanes comprising aliphatic triple bond containing-alkoxy groups act as a component that prevents gelling on the applicator roll, when the compositions of this invention are used in thin film form on an applicator roll, gelling does not take place, which makes uniform coating possible. Furthermore, the composition of the present invention has the advantage of forming cured coatings having superior release properties in a short period of time even under comparatively low-temperature conditions. The compositions of this invention are suitable for the manufacture of release films and release paper for tacky substances.

EXAMPLES

In the Examples, the word "part" denotes parts by weight, and the word "viscosity" denotes a viscosity value measured in mPa·s (millipascal-seconds), 1 mPa·s=1 centipoise (cP), at a temperature of 25° C. In addition, the "pot life" (change in viscosity), thin film gelling time, curability, as well as peeling resistance, and the rate of residual adhesive strength of the obtained silicone release coating compositions were measured in accordance with the methods described below.

Pot life (change in viscosity): 200 g of a silicone release coating composition was put in a 450-mL glass vessel and subjected to agitation (at 200 rpm) at a temperature of 25° C., measuring viscosity at predetermined intervals (2 hours or 8 hours).

Thin film gelling time: A silicone release coating composition was coated on a film made of polyethylene terephthalate to produce a layer with a thickness of 10 μm. After coating, it was allowed to stand, measuring the time required for curing, which was used as the gelling time.

Curability: 200 g of a silicone release coating composition was put in a 450-mL glass vessel and subjected to agitation (at 200 rpm) at a temperature of 25° C. A portion was taken out at predetermined intervals (2 hours or 8 hours) and coated on polyethylene-laminated paper in the amount of about 1.0 g/m². Next, the polyethylene-laminated paper was placed in a hot air circulation oven at a temperature of 110° C. and the time (in seconds) required for the formation of a completely cured coating was measured. In addition, the criterion used to determine the formation of a cured coating was the point in time when rubbing the cured surface with fingers did not cause film lift-off or smearing.

Peeling resistance: A silicone release coating composition was coated on polyethylene-laminated paper in the amount of about 1.0 g/m². Next, it was cured by heating for 30 seconds in a hot air circulation oven at a temperature of 130° C. An acrylic solvent-type pressure sensitive adhesive (from Toyo Ink Manufacturing Co., Ltd., trade name: ORIBAIN BPS-5127) was coated on the surface of the resulting cured coating and subjected to heat treatment for 2 hours at a temperature of 70° C. Next, a polyester film (from Toray Industries, Inc., trade name: RUMIRA-S-10×25μ) was fastened onto this treated surface and aging was conducted for 1 day at a temperature of 25° C. under a pressure of 20 g/cm², whereupon test samples with a width of 5 cm were made by cutting. The polyester film of these test samples was peeled off by using a tension testing machine at an angle of 180 degrees at a rate of 0.3 m/minute, measuring the force (g/width of 5 cm) required for peeling.

Rate of residual adhesive strength: A silicone release coating composition was coated on polyethylene-laminated paper in the amount of about 1.0 g/m². Next, it was cured by heating for 30 seconds in a hot air circulation oven at a temperature of 130° C. A pressure-sensitive adhesive tape made of polyester (from Nitto Denko Corporation, trade name: Nitto Polyester Tape 31B) was fastened onto the surface of the resulting cured coating, and, upon conducting aging for 20 hours at a temperature of 70° C. under a pressure of 20 g/cm², the tape was peeled off. Next, the peeled tape was fastened to a stainless-steel plate by using a 2 Kg rubber roller and subjected to treatment for 30 minutes at a temperature of 25° C. under a pressure of 20 g/cm². After that, the fastened tape was peeled off the stainless-steel plate by using a tension testing machine at an angle of 180 degrees at a rate of 0.3 m/minute, measuring the residual adhesive strength (g). Separately, the adhesive strength (g) of the above mentioned polyester pressure-sensitive adhesive tape fastened to the stainless-steel plate using the 2 Kg rubber roller was measured in the same manner, and used as the basic adhesive strength. The rate of residual adhesive strength was calculated based on these measured values:

Rate of residual adhesive strength (%)=(residual adhesive strength/basic adhesive strength)×100

Example 1

About 100 parts of a dimethylhexenylsiloxy-terminated dimethylsiloxane-methylhexenylsiloxane copolymer having a viscosity of 400 mpa·s and containing about 3.0 mol % hexenyl groups, 4 parts of a trimethylsiloxy-terminated methyl-hydrogen-polysiloxane having a viscosity of 20 mPa·s were mixed, and then 0.2 parts of 3-methyl-1-butyne-3-ol and 0.5 parts of an organosiloxane containing an aliphatic triple bond-containing alkoxy group and having the formula:

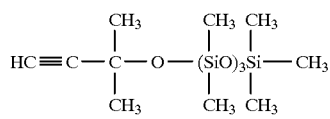

were added and homogeneously mixed therewith. Then, a complex of platinum and divinyltetramethyldisiloxane in the amount of 100 ppm, as converted to platinum metal, per 100 parts of this mixture was added thereto and homogeneously mixed therewith, forming a silicone release coating composition. The pot life (change in viscosity), thin film gelling time, curability, as well as the peeling resistance and the rate of residual adhesive strength of the obtained silicone release coating composition were measured and the results were shown in Tables 1 and 2.

Comparison Example 1

A silicone release coating composition was prepared in the same manner as in Example 1, except that the organosiloxane containing the aliphatic triple bond-containing alkoxy group was not added and the amount of 3-methyl-1-butyne-3-ol was changed to 0.7 parts. The pot life (change in viscosity), thin film gelling time, curability, as well as the peeling resistance and the rate of residual adhesive strength of the obtained silicone release coating composition were measured and the results were shown in Tables 1 and 2.

Comparison Example 2

A silicone release coating composition was prepared in the same manner as in Example 1, except that the 3-methyl-1-butyne-3-ol was not added and the amount of the organosiloxane containing the aliphatic triple bond-containing alkoxy group was changed to 0.7 parts. The pot life (change in viscosity), thin film gelling time, curability, as well as the peeling resistance and the rate of residual adhesive strength of the obtained silicone release coating composition were measured and the results were shown in Tables 1 and 2.

Comparison Example 3

A silicone release coating composition was prepared in the same manner as in Example 1, except that the 3-methyl-1-butyne-3-ol and the organosiloxane containing the aliphatic triple bond-containing alkoxy group were not added and instead 0.7 parts of methyl-tris-(3-methyl-1-butyne-3-oxy)silane was added to the composition. The pot life (change in viscosity), thin film gelling time, curability, as well as the peeling resistance and the rate of residual adhesive strength of the obtained silicone release coating composition were measured and the results were shown in Tables 1 and 2.

Example 2

100 parts of a dimethylhexenylsiloxy-terminated dimethylsiloxane-methylhexenylsiloxane copolymer having a viscosity of 400 mPa·s and containing about 3.0 mol % hexenyl groups, 4 parts of a trimethylsiloxy-terminated methylhydrogenpolysiloxane having a viscosity of 20 mPa·s were mixed, and then 0.2 parts of 1-ethynyl-1-cyclohexanol and 0.5 parts of an organosiloxane containing an aliphatic triple bond-containing alkoxy group and having the formula:

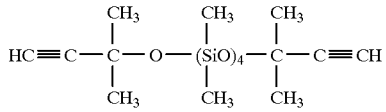

were added and homogeneously mixed therewith. Then, a complex of platinum and divinyltetramethyldisiloxane in the amount of 100 ppm, as converted to platinum metal, per 100 parts of this mixture was added thereto and homogeneously mixed therewith, forming a silicone release coating composition. The pot life (change in viscosity), thin film gelling time, curability, as well as the peeling resistance and the rate of residual adhesive strength of the obtained silicone release coating composition were measured and the results were shown in Tables 1 and 2.

Example 3

100 parts of a dimethylvinylsiloxy-terminated dimethylpolysiloxane having a viscosity of 350 mPa·s, 4 parts of a trimethylsiloxy-terminated methylhydrogen-polysiloxane having a viscosity of 20 mPa·s were mixed, whereupon 0.2 parts of 1-ethynyl-1-cyclohexanol and 0.5 parts of an organosiloxane containing an aliphatic triple bond-containing alkoxy group having the formula:

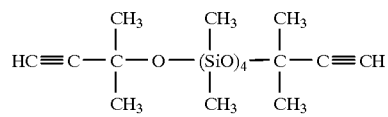

were added and homogeneously mixed therewith. Then, a complex of platinum and divinyltetramethyldisiloxane in the amount of 100 ppm, as converted to platinum metal, per 100 parts of this mixture was added thereto and homogeneously mixed therewith, forming a silicone release coating composition. The pot life (change in viscosity), thin film gelling time, curability, as well as the peeling resistance and the rate of residual adhesive strength of the obtained silicone release coating composition were measured and the results were shown in Tables 1 and 2.

TABLE 1

|  | Pot life (centipoise) | | | Curability (seconds) | | | Gelling |
|---|---|---|---|---|---|---|---|
|  | Immediately | 2 hours later | 8 hours later | Immediately | 2 hours later | 3 hours later | time (hours) |
| Example 1 | 350 | 360 | 375 | 15 | 20 | 30 | 4.50 |
| Example 2 | 360 | 365 | 375 | 20 | 25 | 35 | 5.50 |
| Example 3 | 320 | 325 | 330 | 25 | 30 | 40 | 6.00 |
| Comp. Example 1 | 360 | 370 | 385 | 35 | 45 | 60 | 1.50 |
| Comp. Example 2 | 350 | Gelling | Gelling | 15 | Gelling | Gelling | 1.00 |
| Comp. Example 3 | 355 | 360 | 365 | 80 | 95 | 115 | 8.00 |

TABLE 2

|  | Peeling resistance (g/width 5 cm) | Rate of residual adhesive strength (%) |
|---|---|---|
| Example 1 | 23 | 95 |
| Example 2 | 27 | 96 |
| Example 3 | 23 | 94 |
| Comp. Example 1 | 25 | 94 |
| Comp. Example 2 | 22 | 95 |
| Comp. Example 3 | 153 | 92 |

That which is claimed is:

1. A silicone release coating composition comprising:
   (A) 100 parts by weight of a diorganopolysiloxane having at least two alkenyl groups in each molecule;
   (B) 1–20 parts by weight of an organohydrogenpolysiloxane having at least three silicon-bonded hydrogen atoms in each molecule;
   (C) 0.1–5.0 parts by weight of a mixture of:
      (i) an alkynyl alcohol and
      (ii) an organosiloxane having the formula:

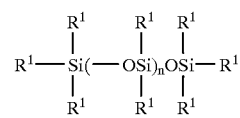

wherein each $R^1$ is independently selected from the group consisting of aliphatic monovalent hydrocarbon groups and aliphatic triple bond-containing alkoxy groups having from 1 to 10 carbon atoms, with the proviso that at least one $R^1$ group is an aliphatic triple bond-containing alkoxy group, n is an integer with a value of 0 to 10, and wherein the weight ratio of component (i) to component (ii) is from 1/20 to 20/1; and (D) a platinum group metal catalyst, in an amount such that the amount of platinum metal is from 1 to 1,000 parts by weight per 1,000,000 parts by weight of the total amount of components (A)–(C).

2. A composition according to claim 1, wherein (A) is selected from the group consisting of dimethylsiloxane-methylvinylsiloxane copolymers, dimethylsiloxane-methylhexenylsiloxane copolymers, dimethylsiloxane-methylvinylsiloxane-methylphenylsiloxane copolymers, alkenyldimethylsiloxy-terminated dimethylsiloxane-methylhexenylsiloxane-methylphenylsiloxane copolymers, trimethylsiloxy-terminated dimethylsiloxane-methylhexenylsiloxane-methylphenylsiloxane copolymers, and alkenyldimethylsiloxy-terminated dimethylpolysiloxanes.

3. A composition according to claim 1, wherein (B) is selected from the group consisting of dimethylhydrogensiloxy-terminated dimethylsiloxane-methylhydrogensiloxane copolymers, trimethylsiloxy-terminated dimethylsiloxane-methylhydrogensiloxane copolymers, trimethylsiloxy-terminated methylhydrogenpolysiloxanes, cyclic methylhydrogensiloxanes, copolymers comprising methylhydrogensiloxy units and SiO$_2$ units.

4. A composition according to claim 1, wherein (C)(i) is selected from the group consisting of 3-methyl-1-butyne-3-ol, 3-methyl-i-pentene-3-ol, 3,5-dimethyl-1-hexyne-3-ol, and 1-ethynyl-1-cyclohexanol.

5. A composition according to claim 1, wherein the aliphatic monovalent hydrocarbon groups are selected from the group consisting of methyl, ethyl, propyl, and butyl, vinyl, and hexenyl.

6. A composition according to claim 1, wherein the aliphatic triple bond-containing alkoxy groups are selected from the group consisting of

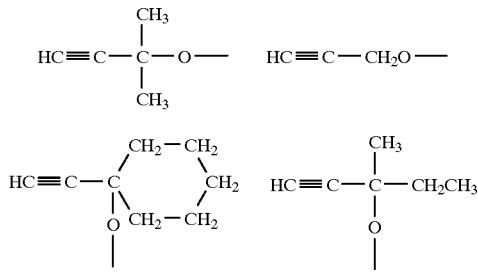

7. A composition according to claim 1, wherein (C)(ii) is selected from the group consisting of

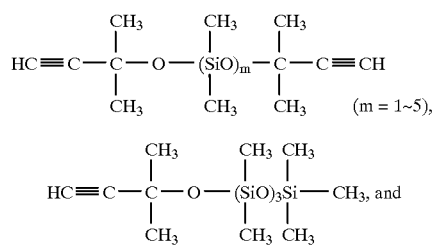

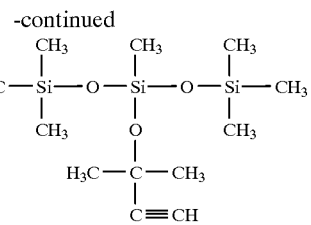

8. A composition according to claim 1, wherein (D) is selected from the group consisting of chloroplatinic acid, alcohol-modified chloroplatinic acid, olefin complexes of chloroplatinic acid, complexes of chloroplatinic acid and vinylsiloxane, platinum microparticles adsorbed on a carbon-powder carrier, and platinum black catalysts.

9. A silicone release coating composition obtained by a method comprising:
(I) mixing:
(A) 100 parts by weight of a diorganopolysiloxane having at least two alkenyl groups in each molecule;
(B) 1–20 parts by weight of an organohydrogenpolysiloxane having at least three silicon-bonded hydrogen atoms in each molecule;
(C) 0.1–5.0 parts by weight of a reaction retardant obtained by a method comprising mixing:
(i) an alkynyl alcohol and
(ii) an organosiloxane having the formula:

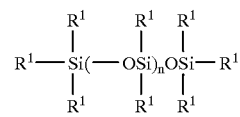

wherein each $R^1$ is independently selected from the group consisting of aliphatic monovalent hydrocarbon groups and aliphatic triple bond-containing alkoxy groups having from 1 to 10 carbon atoms, with the proviso that at least one $R^1$ group is an aliphatic triple bond-containing alkoxy group, n is an integer with a value of 0 to 10, and wherein the weight ratio of component (i) to component (ii) is from 1/20 to 20/1; and
(D) a platinum group metal catalyst, in an amount such that the amount of platinum metal is from 1 to 1,000 parts by weight per 1,000,000 parts by weight of the total amount of components (A)–(C).

10. A composition according to claim 9, wherein (A) is selected from the group consisting of dimethylsiloxane-methylvinylsiloxane copolymers, dimethylsiloxane-methylhexenylsiloxane copolymers, dimethylsiloxane-methylvinylsiloxane-methylphenylsiloxane copolymers, alkenyldimethylsiloxy-terminated dimethylsiloxane-methylhexenylsiloxane-methylphenylsiloxane copolymers, trimethylsiloxy-terminated dimethylsiloxane-methylhexenylsiloxane-methylphenylsiloxane copolymers, and alkenyldimethylsiloxy-terminated dimethylpolysiloxanes.

11. A composition according to claim 9, wherein (B) is selected from the group consisting of dimethylhydrogensiloxy-terminated dimethylsiloxane-methylhydrogensiloxane copolymers, trimethylsiloxy-terminated dimethylsiloxane-methylhydrogensiloxane copolymers, trimethylsiloxy-terminated methylhydrogenpolysiloxanes, cyclic methylhydrogensiloxanes, copolymers comprising methylhydrogensiloxy units and SiO$_2$ units.

12. A composition according to claim 9, wherein (C)(i) is selected from the group consisting of 3-methyl-1-butyne-3-ol, 3-methyl-1-pentene-3-ol, 3,5-dimethyl-1-hexyne-3-ol, and 1-ethynyl-1-cyclohexanol.

13. A composition according to claim 9, wherein the aliphatic monovalent hydrocarbon groups are selected from the group consisting of methyl, ethyl, propyl, and butyl, vinyl, and hexenyl.

14. A composition according to claim 9, wherein the aliphatic triple bond-containing alkoxy groups are selected from the group consisting of

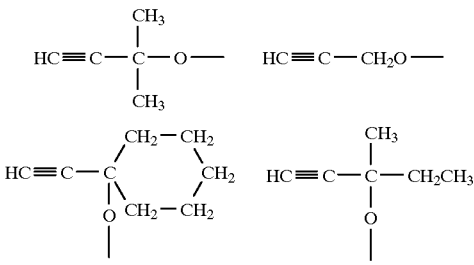

15. A composition according to claim 9, wherein (C)(ii) is selected from the group consisting of

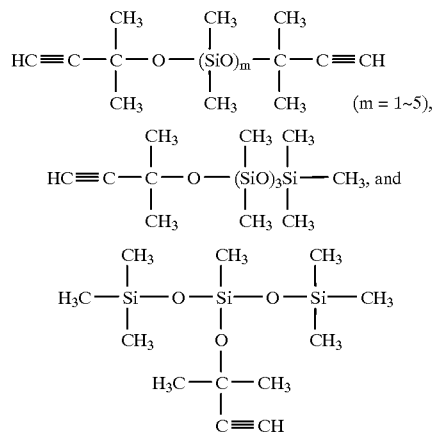

16. A composition according to claim 9, wherein (D) is selected from the group consisting of chloroplatinic acid, alcohol-modified chloroplatinic acid, olefin complexes of chloroplatinic acid, complexes of chloroplatinic acid and vinylsiloxane, platinum microparticles adsorbed on a carbon-powder carrier, and platinum black catalysts.

17. A treated substrate obtained by a method comprising:

(I) applying a silicone release coating composition to the surface of a substrate wherein the silicone release coating composition comprises:

(A) 100 parts by weight of a diorganopolysiloxane having at least two alkenyl groups in each molecule;

(B) 1–20 parts by weight of an organohydrogenpolysiloxane having at least three silicon-bonded hydrogen atoms in each molecule;

(C) 0.1–5.0 parts by weight of a mixture of:
(i) an alkynyl alcohol and
(ii) an organosiloxane having the formula:

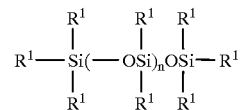

wherein each $R^1$ is independently selected from the group consisting of aliphatic monovalent hydrocarbon groups and aliphatic triple bond-containing alkoxy groups having from 1 to 10 carbon atoms, with the proviso that at least one $R^1$ group is an aliphatic triple bond-containing alkoxy group, n is an integer with a value of 0 to 10, and wherein the weight ratio of component (i) to component (ii) is from 1/20 to 20/1; and (D) a platinum group metal catalyst, in an amount such that the amount of platinum metal is from 1 to 1,000 parts by weight per 1,000,000 parts by weight of the total amount of components (A)–(C); and (II) exposing the coating and the substrate to heat in an amount sufficient to cure the coating.

18. A treated substrate according to claim 17, wherein the method further comprises (III) adding a pressure sensitive adhesive to the substrate after step (II).

* * * * *